US012619305B2

(12) United States Patent
Kononov et al.

(10) Patent No.: US 12,619,305 B2
(45) Date of Patent: May 5, 2026

(54) POWER MANAGEMENT

(71) Applicant: SeeTrue Technologies Oy, Joensuu (FI)

(72) Inventors: Maxim Kononov, Joensuu (FI); Piotr Bartczak, Joensuu (FI); Roman Bednarik, Joensuu (FI); Miika Toivanen, Joensuu (FI); Kristian Lukander, Joensuu (FI)

(73) Assignee: SeeTrue Technologies Oy, Joensuu (FI)

( * ) Notice: Subject to any disclaimer, the term of this patent is extended or adjusted under 35 U.S.C. 154(b) by 0 days.

(21) Appl. No.: 18/929,815

(22) Filed: Oct. 29, 2024

(65) Prior Publication Data

US 2026/0118953 A1 Apr. 30, 2026

(51) Int. Cl.
| | |
|---|---|
| *G06F 3/01* | (2006.01) |
| *G06F 1/324* | (2019.01) |
| *H04N 23/65* | (2023.01) |
| *H04N 23/74* | (2023.01) |

(52) U.S. Cl.
CPC .............. *G06F 3/013* (2013.01); *G06F 1/324* (2013.01); *H04N 23/651* (2023.01); *H04N 23/74* (2023.01)

(58) Field of Classification Search
CPC ....... G06F 3/013; G06F 1/324; H04N 23/651; H04N 23/74
USPC ......................................................... 348/78
See application file for complete search history.

(56) References Cited

U.S. PATENT DOCUMENTS

| | | | | |
|---|---|---|---|---|
| 7,091,471 | B2 * | 8/2006 | Wenstrand ............ | G06F 1/3231 250/221 |
| 9,104,467 | B2 * | 8/2015 | Frank .................... | G06F 1/3234 |
| 10,212,343 | B2 * | 2/2019 | Eskilsson .............. | G06V 40/18 |
| 10,684,685 | B2 * | 6/2020 | Young ................... | G06F 3/0304 |
| 11,307,659 | B2 * | 4/2022 | Sengelaub ........... | H04N 23/667 |
| 2018/0271364 | A1 * | 9/2018 | Orlosky .............. | A61B 5/4082 |

FOREIGN PATENT DOCUMENTS

CN        115984950 A        4/2023

* cited by examiner

*Primary Examiner* — John W Miller
*Assistant Examiner* — Omer Khalid
(74) *Attorney, Agent, or Firm* — Laine IP Oy

(57) ABSTRACT

According to an example aspect of the present invention, there is provided an apparatus configured to control elements of an eye tracking apparatus to perform plural determinations of rotation of an eye in an eye socket, determine a time period based at least in part on a determination based on the rotation of the eye, wherein the time period begins as a response to a rotation of the eye falling below a threshold, and switch at least a part of the eye tracking apparatus to a power saving state as a response to the determined time period beginning, and switch the at least part of the eye tracking apparatus out of the power saving state as a response to the determined time period ending.

13 Claims, 5 Drawing Sheets

Controlling elements of an eye tracking apparatus to perform plural determinations of rotation of an eye in an eye socket        510

Determining a time period based at least in part on a determination based on the rotation of the eye, wherein the time period begins as a response to a rotation of the eye falling below a threshold        520

Switching at least a part of the eye tracking apparatus to a power saving state as a response to the time period beginning, and switching the at least the part of the eye tracking apparatus out of the power saving state as a response to the time period ending        530

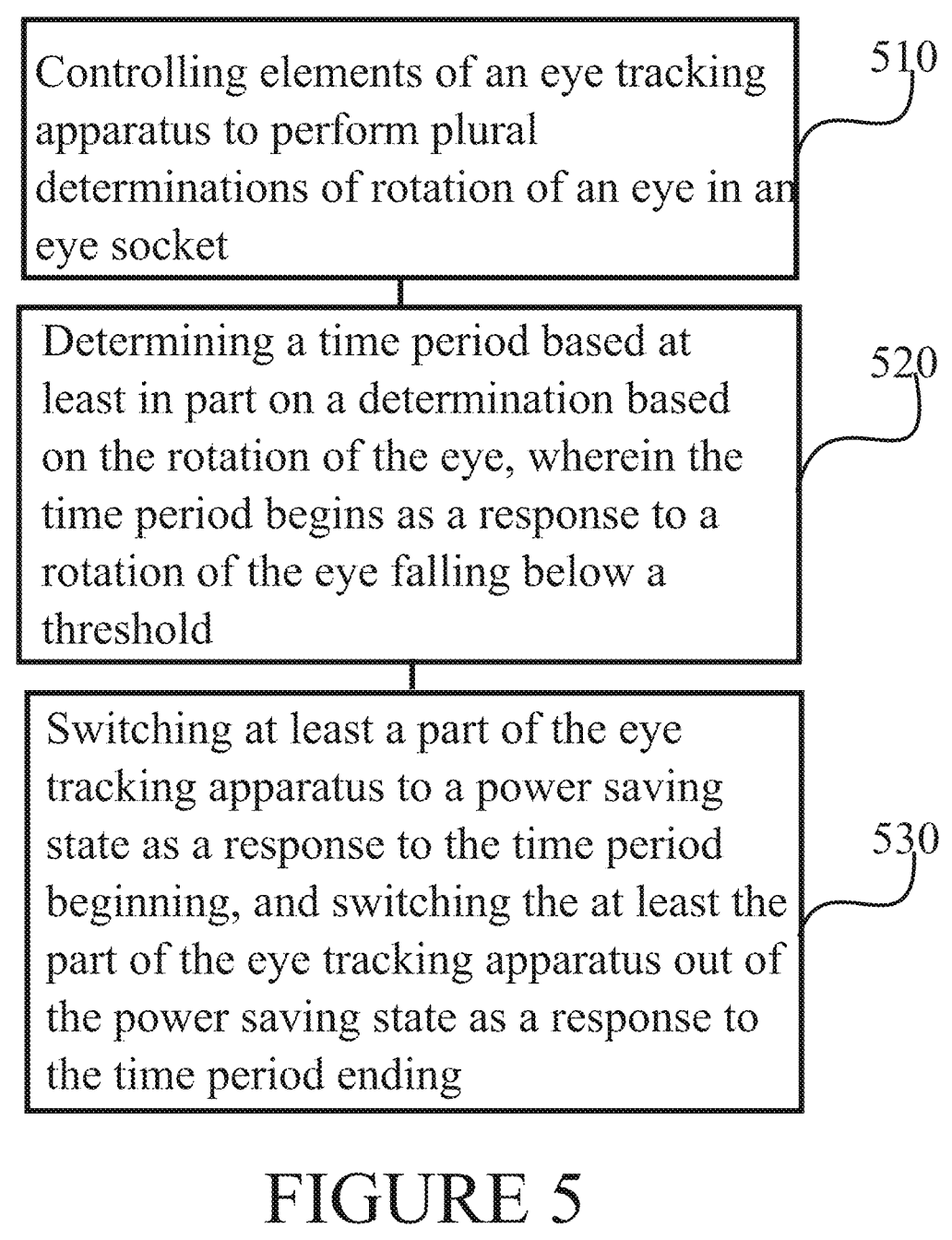

Controlling elements of an eye tracking apparatus to perform plural determinations of rotation of an eye in an eye socket    510

Determining a time period based at least in part on a determination based on the rotation of the eye, wherein the time period begins as a response to a rotation of the eye falling below a threshold    520

Switching at least a part of the eye tracking apparatus to a power saving state as a response to the time period beginning, and switching the at least the part of the eye tracking apparatus out of the power saving state as a response to the time period ending    530

FIGURE 5

POWER MANAGEMENT

FIELD

The present disclosure relates to power management and energy conservation, for example in eye tracking devices.

BACKGROUND

Determining what a user looks at is of interest in a number of different fields. For example, a disabled person may be equipped with a gaze tracker enabling her to input characters to form words and sentences. As another example, an ambulance driver may be enabled to safely operate equipment of his ambulance, or a nuclear power station operator may have his gaze tracked to detect episodes of fatigue during a shift.

Eye-tracking solutions on and for ocular devices such as microscopes, eye-glasses, wearable displays, binoculars, and viewfinders may be used to implement augmented reality, AR, or virtual reality, VR, applications. Further, a driver or pilot of a vehicle may be provided information on the technical state of the vehicle, or warnings concerning obstacles.

SUMMARY

According to some aspects, there is provided the subject-matter of the independent claims. Some embodiments are defined in the dependent claims.

According to a first aspect of the present disclosure, there is provided an apparatus comprising at least one processing core and at least one memory storing instructions that, when executed by the at least one processing core, cause the apparatus at least to control elements of an eye tracking apparatus to perform plural determinations of rotation of an eye in an eye socket, determine a time period based at least in part on a determination based on the rotation of the eye, wherein the time period begins as a response to a rotation of the eye falling below a threshold, and switch at least a part of the eye tracking apparatus to a power saving state as a response to the determined time period beginning, and switch the at least part of the eye tracking apparatus out of the power saving state as a response to the determined time period ending.

According to a second aspect of the present disclosure, there is provided an apparatus comprising at least one processing core and at least one memory storing instructions that, when executed by the at least one processing core, cause the apparatus at least to control elements of an eye tracking apparatus to perform plural determinations of a pupil size of an eye, determine a time period based at least in part on a determination based on the pupil size of the eye, wherein the time period begins as a response to rate of change of the pupil size falling below a threshold, and switch at least a part of the eye tracking apparatus to a power saving state as a response to the determined time period beginning, and switch the at least part of the eye tracking apparatus out of the power saving state as a response to the determined time period ending.

According to a third aspect of the present disclosure, there is provided a method, comprising controlling elements of an eye tracking apparatus to perform plural determinations of rotation of an eye in an eye socket, determining a time period based at least in part on a determination based on the rotation of the eye, wherein the time period begins as a response to a rotation of the eye falling below a threshold, and switching at least a part of the eye tracking apparatus to a power saving state as a response to the determined time period beginning, and switching the at least part of the eye tracking apparatus out of the power saving state as a response to the determined time period ending.

According to a fourth aspect of the present disclosure, there is provided a non-transitory computer readable medium having stored thereon a set of computer readable instructions that, when executed by at least one processor, cause an apparatus to at least control elements of an eye tracking apparatus to perform plural determinations of rotation of an eye in an eye socket, determine a time period based at least in part on a determination based on the rotation of the eye, wherein the time period begins as a response to a rotation of the eye falling below a threshold, and switch at least a part of the eye tracking apparatus to a power saving state as a response to the determined time period beginning, and switch the at least part of the eye tracking apparatus out of the power saving state as a response to the determined time period ending.

BRIEF DESCRIPTION OF THE DRAWINGS

FIG. 5 is a flow graph of a method in accordance with at least some embodiments of the present invention.

EMBODIMENTS

Power saving solutions for eye-tracking apparatuses are herein disclosed. Eye-tracking may include, e.g., estimating the gaze direction, eye movements, and/or estimating the three-dimensional, 3D, position of the eye. In particular, solutions which are designed using information on patterns in eye movement are disclosed, which enable saving energy in the eye tracking apparatus while maintaining gaze tracking precision by using a power saving state when high-resolution tracking is momentarily not needed. For example, if the gaze direction is estimated to move slowly, the eye is probably fixating and a time resolution of gaze tracking may be reduced for the duration of the process of fixation, since an eye in the process of fixating may be tracked using a lower gaze tracking frame rate.

Figure 1A:
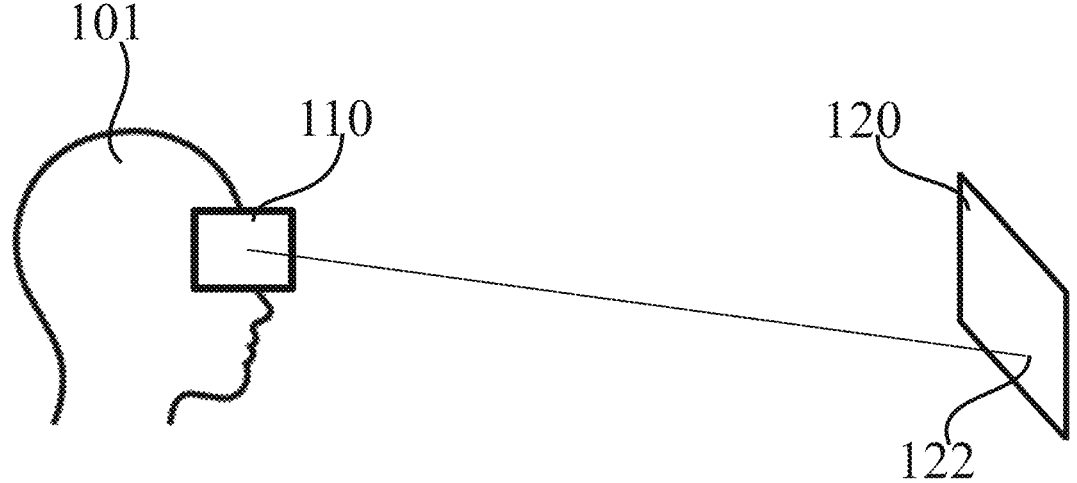
FIG. 1A illustrates an example system in accordance with at least some embodiments of the present invention.

FIG. 1A illustrates an example system in accordance with at least some embodiments of the present invention. In the system, a user 101 uses a device 110 which comprises an eye-tracking apparatus. The user may look at a screen 120, for example, or more generally the user may look at a view through device 110 or in device 110, such that device 110 determines, using the eye-tracking apparatus, a point 122 the user looks at, or a direction in which the user's gaze is oriented. The tracking may be performed on one of the user's eyes, or both eyes. When both eyes are tracked, the determining of a point 122 in space where the user's gaze is fixed is possible. On the other hand, when a single eye is tracked, the direction where this eye is fixed may be determined, for example by observing that the gaze direction moves from an earlier fixed direction and stops at a new fixed direction. In a terminological sense, gaze tracking, by which it is meant the determination where the user looks, may be performed based on information obtained from eye tracking, by which it is meant determining how the user's eyeball moves. To perform gaze tracking, in general, an apparatus may control elements of an eye tracking apparatus to perform determinations of rotation of an eye in an eye socket where the eye is located. The elements of the eye tracking apparatus may comprise, for example, at least one an illuminator and an imaging sensor.

Determinations of rotation of an eye may be based on determining the rate of rotation from change in gaze direction, or, alternatively, the eye tracking apparatus may be configured to estimate the rate of rotation, that being the angular velocity of the eye in the socket, directly from observing the eye separately from determining a gaze direction. The rate of rotation may be estimated, for example, using intensity values in eye image pixels and comparing these intensities between a previous eye image and a current eye image; when the eye is not rotating, the intensity values are approximately equal so the average of the absolute values of the intensity differences in the previous and current image is close to zero, yet non-zero due to the image noise. As another example, the rate of rotation can be estimated from the change of the coordinates of a detected eye image feature that is used in gaze tracking, e.g., the pupil center, in the previous eye image and current eye image; when the eye is not rotating, the pupil center should have same image coordinates in the previous eye image and the current eye image. Thus, the rate of rotation may be estimated even without estimating the rotation in degrees but in some other units, such as image intensity values or image coordinates.

Device 110 may be a head-mountable virtual reality, VR, display, smart glasses, or an ocular device. An ocular device may be used with, or be comprised as part of, a microscope or binoculars, for example. By ocular device it is herein meant a device fixed to an optical instrument which is configured to be used with the user's eye in its immediate proximity, within 5 centimetres, cm, for example. The ocular device also comprises optical elements, such as plural lenses, to modify a directional quality of a light field proceeding toward the user's eye to a suitable directional form.

Figure 1B:
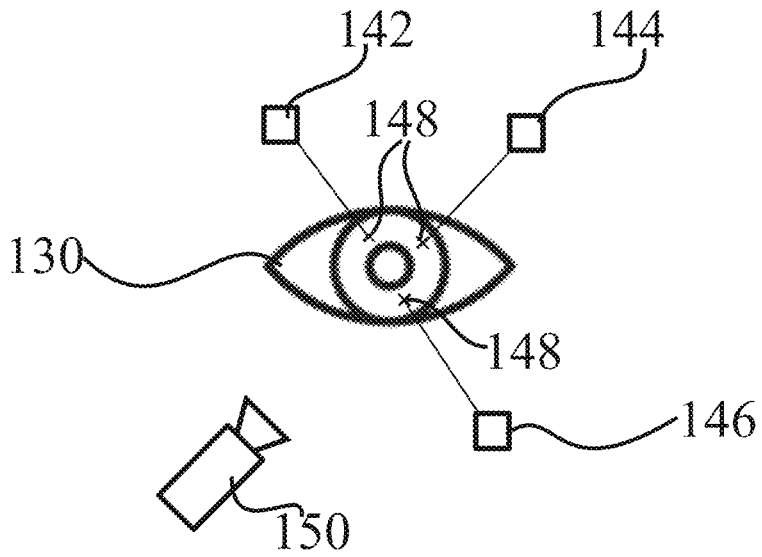
FIG. 1B illustrates an eye-tracking apparatus.

FIG. 1B illustrates an eye-tracking apparatus. The eye-tracking apparatus comprises plural illuminators 142, 144, 146, and at least one sensor 150. Examples of a sensor are a camera and a photodiode. Sensor 150 may be an imaging sensor. When in use device 110 comprising the eye-tracking apparatus of FIG. 1B is near the user's eye 130, and the illuminators 142, 144, 146 illuminate the surface of the eye, causing glints 148 on the moist surface of the eye, for example in the corneal region. Sensor 150 is sensitive to the wavelength(s) emitted by illuminators 142, 144, 146 and thus glints 148 are visible in a sensor data feed provided by sensor 150 as output. Sensor 150 may be a video sensor configured to provide image frames at a constant or configurable frame rate, such as 30 frames per second, for example, or a selectable frame rate of between one frame per second to one hundred frames per second, for example. In some embodiments, illuminators 142, 144, 146 are configured to provide a flash of illumination at times which are synchronized with exposure times of sensor 150. Thus the illuminators may be switched off at times when sensor 150 does not collect light for an image frame, saving energy.

Illuminators 142, 144, 146 may be configured to emit light in the infrared spectral region, such as the near-infrared, NIR, which provides the benefit that they do not distract the user, since humans cannot see infrared light. Of course, sensor 150 in this case is sensitive to infrared light. Illuminators 142, 144, 146 may be NIR light-emitting diode, LED, light sources, for example. The NIR spectral band may be defined as between 0.75 to 1.4 micrometres, μm, in wavelength. The manner illuminators 142, 144, 146 are distributed in the eye tracking apparatus, and the number of illuminators used, depends on the specific application and requirements thereof.

A controller may control elements of an eye tracking apparatus to perform a determination of a gaze direction, or of rotation of the eye in the eye socket, more than once. In other words, the controller may control elements of the eye tracking apparatus, such as the illuminators and the imaging sensor, to obtain from these elements eye tracking data, which is then processed to obtain gaze tracking estimates. Obtaining a gaze tracking estimate amounts to determining a gaze direction. Also other factors than the gaze direction may be computed from the eye data, such as eye position and blink rate. The controller or processor configured to perform these tasks may be comprised in the eye tracking apparatus, or be distinct from it. In some embodiments, the eye tracking apparatus tracks gaze direction separately from determinations used to switch a power saving mode on, such that determinations concerning switching the power saving mode on are based on rotation of the eye in the eye socket, independently of gaze direction.

Robust eye-tracking apparatuses with reduced energy consumption are needed, for example for battery-operated use cases. Various head-mounted devices with gaze tracking functionalities exist, such as VR or AR devices, eye diagnostics systems, wearable displays, and other eye- and eyesight related devices. Their manufacturers provide stand-alone systems that do not need to be powered from a stable power source as do other systems. These portable devices receive energy from batteries. However, batteries have inherently limited energy capacities, which decreases the overall device operating time. Also for devices powered from a stable power source, energy savings are of interest. A typical infrared imaging sensor 150 used in an eye tracking apparatus consumes about 100 milliwatts, mW, of energy. In binocular systems, the combined power consumption of the imaging sensors 150, illuminators 142, 144, 146 and other parts of the eye tracking apparatus reach levels which impair usability of the systems, in particular for battery-powered use cases.

Eye-tracking apparatuses may be integrated into such devices, such as ocular devices, which support their functionality, such as optimized display rendering, optimized eye diagnostics and others. Eye-tracking technology solutions may pursue several goals at the same time, such as porta-bility and energy saving to extend operation times, and at the same time retain their eye tracking accuracy and robustness in different usage contexts.

Various methods may be used to decrease system energy consumption. One direction towards decreasing energy consumption is minimizing the computational complexity that is one of the main factors associated with energy drain. Mathematical algorithms are needed to convert eye tracking data to usable gaze tracking estimates. It is however not a trivial task to perform accurate gaze tracking with simple algorithms, wherefore other ways to reduce energy consumption need to be implemented instead of, or in addition to, reducing computational complexity.

In the case of using displays with eye tracking, dimming the display is possible when there is no useful information on the display to be provided to the user. Another source of energy consumption are the illuminators 142, 144, 146 typically used in eye-tracking apparatuses and discussed above in connection with FIG. 1B. To conserve energy, the illuminators may be modulated by flickering their output, reducing their emitted light power, and/or decreasing a number of active illuminators. Adjusting the frame rate of imaging sensor 150 and synchronizing the flickering of illuminators 142, 144, 146 with the new frame capture schedule is another source for conserving energy, as noted above. However, these energy-saving solutions do not necessarily provide a good compromise solution for energy conservation while maintaining system robustness. In particular, these methods do not leverage information on how the human visual system functions.

Herein are described power saving methods for an apparatus configured to control elements of an eye tracking apparatus to control elements of an eye tracking apparatus to perform plural determinations of rotation of an eye in an eye socket, determine a time period based at least in part on a determination based on the rotation of the eye, wherein the time period begins as a response to a rotation of the eye falling below a threshold, and switch at least a part of the eye tracking apparatus to a power saving state as a response to the determined time period beginning, and switch the at least part of the eye tracking apparatus out of the power saving state as a response to the determined time period ending.

For example, the time period may be determined as commencing after the at least one eye changes its gaze direction from a previous fixed direction to a new fixed direction and the time period having a predetermined duration, or a duration selected by the apparatus. The rotation of the eye in the socket falls below the threshold when the eye arrives at the new fixed direction. The threshold may be expressed in terms of an angular velocity of the rotation of the eye. This is so, since the human eye tends to remain immobile after focusing at a new target. By using this information to switch the eye tracking apparatus to the power saving state, for example for 100-400 milliseconds, ms, energy saving is obtained at negligible cost to robustness of the eye tracking solution. In these embodiments, the power saving state may comprise switching off certain power-consuming elements of the eye tracking apparatus, such as the imaging sensor and/or at least some, and optionally all, illuminators. In some embodiments, the length of the time period is in these embodiments selected further also on the application and/or type of information that is viewed. A table may be compiled which links together viewed information types and lengths of time periods, for example, to enable selecting the length of the time period based on the type of information viewed.

Further, the time period may be determined, and/or a specific power saving state selected from plural possible power saving states, based on an application the eye tracking apparatus sends the determined gaze tracking estimate to. For example, for a video telephony application a more power-limiting power saving state may be chosen than in the case of a remote vehicle steering application, since in the vehicular steering application safety is more important than in video telephony. Likewise in the video telephony use case, the time period may be longer, for example by ten percent, than in the vehicular steering case. In some use applications, such as remote surgery, power saving functions may be altogether disabled to increase safety. Further to basing these choices on the application, they may also depend on a stage of the application. For example, the remote surgery application may use power saving features when the surgery itself has not yet begun and staff are setting up the equipment. Likewise a vehicular driving application may use more active power conservation settings, such as longer time periods of the power saving state, and/or more energy-conserving power saving states, when the vehicle is not moving than when it is moving. Examples of differing power saving states in these embodiments include reductions of differing magnitudes in the gaze tracking imaging frame rate. The greater is the reduction in gaze tracking imaging frame rate, the greater is the power saving, and the greater is the effect on gaze tracking accuracy.

In some embodiments, the eye tracking apparatus or a device controlling the eye tracking apparatus is configured to receive from the application an indication, and to operate the eye tracking apparatus at an imaging frame rate selected by the eye tracking apparatus or the controlling device based on the indication received from the application. For example, the application may indicate that it is in a stage where a higher resolution of gaze tracking, meaning a higher imaging frame rate, is needed, and again when it is in a different stage, where the gaze tracking imaging frame rate may be reduced. Thus a device controlling an eye tracking apparatus, for example, may select the imaging frame rate of gaze tracking, in dependence of the application and/or the active application stage, to a value between one Hertz, Hz, and 100 Hz, for example.

In some embodiments, the time period is determined such that the time period begins when an estimated angular velocity of the eye falls below a threshold, and such that the time period ends when the estimated angular velocity of the eye increases above the threshold. In other words, the time period spans a time when the user's gaze estimation is moving slowly, that is, the user is in the process of fixating on a target or is fixed on the target. After the process of fixating ends, the eye is fixated on the target and no longer moving. In such cases the power saving state may comprise, for example, a reduced gaze tracking imaging frame rate or a temporary shut-down or stand-by of the imaging sensor 150, which is sufficient to track an eye in the process of fixating. In these cases, the start of the time period may be determined before it is known when the time period will end. However the start and end of the time period are nonetheless both determined based on the rotation of the eye—apart from embodiments where the duration of the time period is constant.

In addition, since the estimation of the eye rotation is typically noisy and since the human eye makes tiny movements while fixating, the duration of the time period and/or some power saving features, such as the camera frame rate or the illuminators' power status, may be made to be continuously and linearly or non-linearly dependent on the estimated rate of rotation of the eye, so that a lower rate rotation results in a longer time period or slower frame rate. This is useful when there is uncertainty about the estimation of the change; e.g., a medium-amplitude change may be due to the eye having moved or due to the signal noise during a fixation and the chosen act should reflect the uncertainty, resulting in a medium frame rate. On the contrary, when the estimated change is large, it more dependably indicates that the gaze direction truly changed and results in a higher frame rate so as to get data from the new gaze position as fast as possible.

Further to determined slow eye rotation, the apparatus may be configured to switch on one or more specific one(s) of the illuminators only when the estimated eye rotation is above a second threshold, which may be the same threshold as the threshold, or a different threshold level. Also, a frequency of illumination pulses may be reduced when the angular velocity of the eye is below the threshold rate.

The power saving state may comprise a state wherein one or more illuminators of the eye tracking apparatus are switched off or operated with a reduced pulse frequency, compared to when the eye tracking apparatus is not in the power saving state. In some embodiments, the eye tracking apparatus is configured to track two eyes, and the power saving state is a state wherein the eye tracking apparatus tracks one of the two eyes using a lowered imaging frequency, compared to when the eye tracking apparatus is not in the power saving state. An imaging frequency is a frequency at which the eye tracking apparatus obtains an image of an eye. The device may then switch to imaging both eyes using a higher imaging frame rate as a response to determining that the eye(s) begin to rotate at an angular velocity in excess of the threshold, for example. The power saving state may comprise a state wherein a clock frequency of a processor or controller of the eye tracking apparatus is reduced, compared to when the eye tracking apparatus is not in the power saving state.

In some embodiments, the length of the time period may be in part selected by the user, for example, the user may select that the time periods are extended by ten percent, or reduced in length by ten percent, to enable the user to select another balance between power saving and accuracy of gaze tracking. This user-configurable feature may be used in combination with dynamic ways to determine the length of the time period discussed above.

In some embodiments, a wavelength of the illuminators' light is selected so that it most stimulates the imaging sensor to minimize the consumption of energy in the illumination. In some embodiments, the number of active illuminators is optimized and minimized by predicting or observing an active area of the imaging sensor and corresponding illuminators. Thus some illuminators may be switched off, as it is determined that they do not in the instant contribute to gaze tracking performance. Feedback may be provided from the gaze tracking algorithm to a device controlling the eye tracking apparatus to enable this.

Further, additionally or alternatively, the number of active illuminators may be optimized by previously learned patterns of eye behaviors and head positions that include head turn direction, gaze direction and effective glints which contribute to eye tracking. Some illuminators may be kept inactive because they cannot produce effective glints in the current geometrical arrangement. This may relate, for example, to driving applications where the user turns his head and gaze toward one side, which enables switching off some illuminators which do not in this geometrical arrangement illuminate the cornea.

Figure 2A:
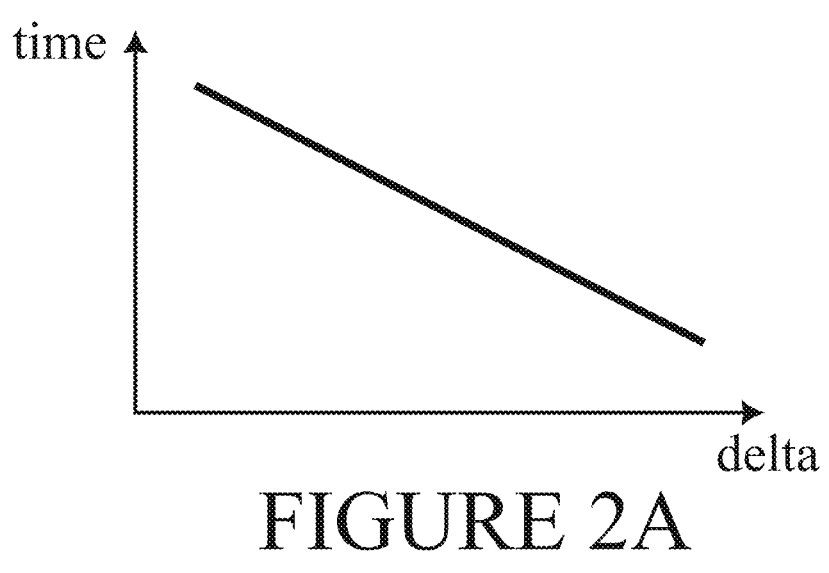
FIG. 2A illustrates an example of dependence of a time period on an amplitude of the estimated gaze direction change.

FIG. 2A illustrates an example of dependence of a determined time period on an amplitude of the estimated eye rotation. The length of the time period during which the power saving state is applied is on the vertical axis, increasing from the bottom toward the top, and the amplitude of the estimated eye rotation, labelled "delta", is on the horizontal axis and increasing from the left toward the right. Here the length of the time period is selected using a linear dependence on the amplitude of the gaze shift, such that when the eye is rotating only slightly, a longer time period is selected by the device. In other words, the length of the time period is selected based on amplitude of the rotation of the eye between subsequent gaze direction fixations.

Figure 2B:
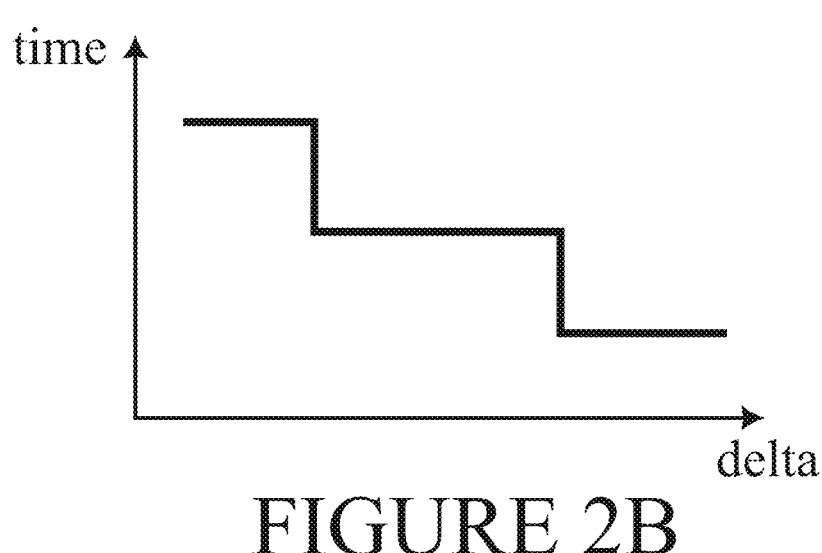
FIG. 2B illustrates an example of dependence of a time period on an amplitude of the estimated gaze direction change.

FIG. 2B illustrates an example of dependence of a time period on an amplitude of the estimated eye rotation. The coordinate system is the same as in FIG. 2A, and here a step function is used rather than the linear function of FIG. 2A. An advantage of the step function is its simplicity compared to the linear function. Operation-wise the logic is similar, with a longer time period selected when the gaze is estimated to shift by a smaller angular amplitude and a shorter time period is selected when the gaze is estimated to shift by a larger angular amplitude.

For example, the "delta" could be an angular difference, reflecting the change in the gaze direction. For example, when "delta" is less than ten degrees, the length of the time period is 100 ms; when "delta" is larger than ten but less than twenty degrees, the length of the time period is 50 ms; when "delta" is larger than twenty degrees, the length of the time period is 0 ms. In addition, for example, when the pupil has not been detected for 50 subsequent frames, the time period is 1000 ms, in order to save power when the eye is not present. As another example, the "delta" could be the Euclidian change of the estimated pupil center between subsequent image frames, in pixels, reflecting the eye rotation. For example, when "delta" is less than four pixels, the length of the time period is 100 ms; when "delta" is larger than four but less than 18 pixels, the length of the time period is 50 ms; when "delta" is larger than 18 pixels, the length of the time period is 0 ms. In addition, for example, when the pupil has not been detected for 50 subsequent frames, the time period is 1000 ms, in order to save power when the eye is not present. The "delta" may thus be a value integrated over the angular velocity of the rotation of the eye, or the "delta" may be a value integrated over a velocity of the pupil center, expressed e.g. in pixels per second. The integration interval may be chosen to be, for example, 50 milliseconds, ms, 100 ms, 150 ms, 200 ms, 250 ms or 300 ms.

Figure 2C:
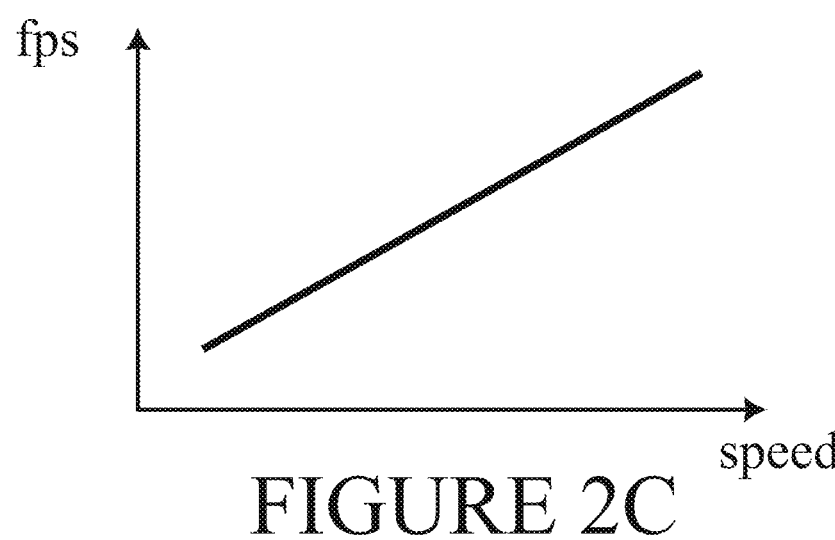
FIG. 2C illustrates an example of dependence of an imaging frame rate on the estimated eye movement speed.

FIG. 2C illustrates an example of dependence of an imaging frame rate on the estimated eye movement rotational speed. The speed of eye rotation is on the horizontal axis, increasing from the left to the right, and the frame rate applied to the imaging sensor 150 is on the vertical axis, increasing from the bottom toward the top. As discussed herein above, when the eye is estimated to rotate faster in the eye socket, the gaze direction is more likely to change and a higher frame rate may be used to track the gaze, and conversely when the eye is estimated to rotate only slowly, the frame rate may be reduced to conserve power. This may also involve reducing a pulse rate of the illuminator(s), with the illuminator pulses synchronized to take place during light capture intervals of the individual image frames. Thus energy is conserved in both the illumination and imaging parts of eye tracking. While the dependency of the frame rate on eye speed is linear in the example of FIG. 2A, a step function may alternatively be used.

Figure 3:
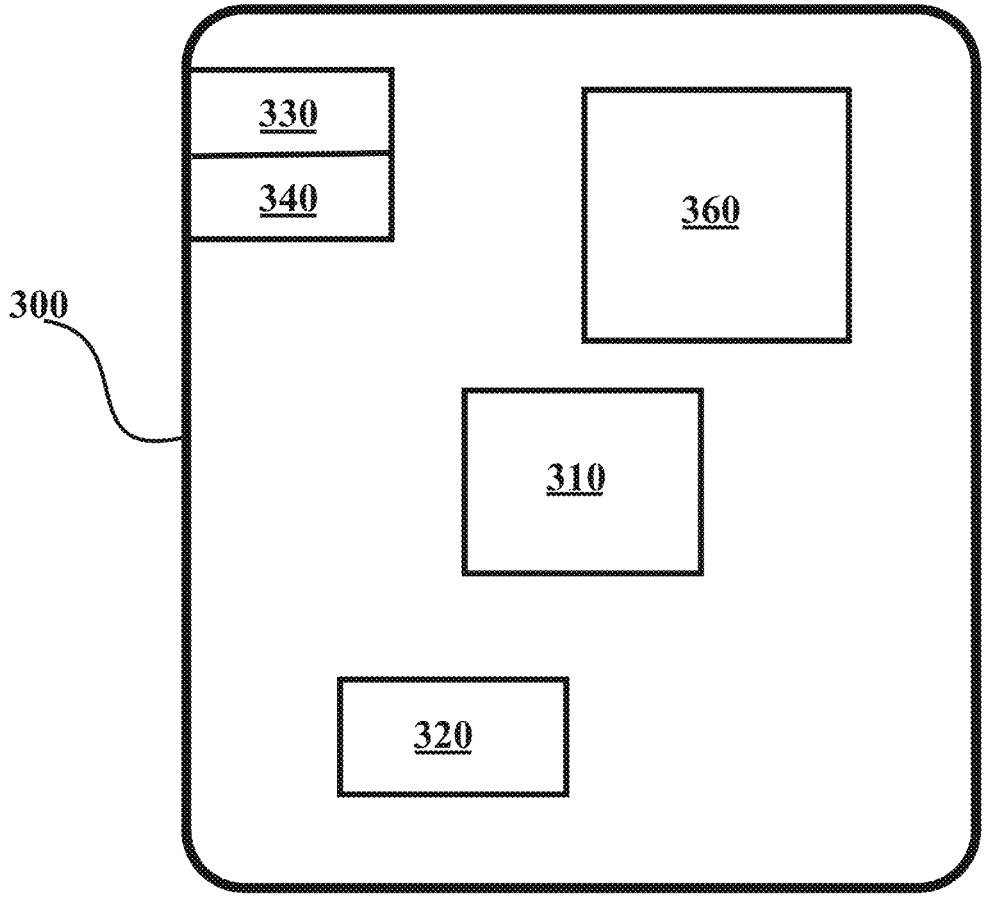
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device configured to control elements of an eye tracking apparatus. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. A processing core or processor may be, or may comprise, at least one qubit. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310, optionally together with memory and computer instructions, may be means for performing method steps in device 300, such as controlling, determining, switching and selecting. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may be a computer readable medium. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part external to device 300 but accessible to device 300. Memory 320 may be transitory or non-transitory. The term "non-transitory", as used herein, is a limitation of the medium itself (that is, tangible, not a signal) as opposed to a limitation on data storage persistency (for example, RAM vs. ROM).

Device 300 may comprise a transmitter 330. Device 300 may comprise a receiver 340. Transmitter 330 and receiver 340 may be configured to transmit and receive, respectively, information in accordance with at least one communication standard. Transmitter 330 may comprise more than one transmitter. Receiver 340 may comprise more than one receiver. Transmitter 330 and/or receiver 340 may be configured to operate in accordance with a suitable communication arrangement, such as parallel or serial communication, for example.

Device 300 may comprise user interface, UI, 360. UI 360 may comprise at least one of a display, a keyboard, a touchscreen, a vibrator arranged to signal to a user by causing device 300 to vibrate, a speaker or a microphone. A user may be able to operate device 300 via UI 360, for example to configure gaze tracking parameters.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300.

Such a receiver may comprise a serial bus receiver arranged to, for example, receive information via at least one electrical lead from receiver 340 for processing in processor 310. Alternatively to a serial bus, the receiver may comprise a parallel bus receiver. Device 300 may comprise further devices not illustrated in FIG. 3.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
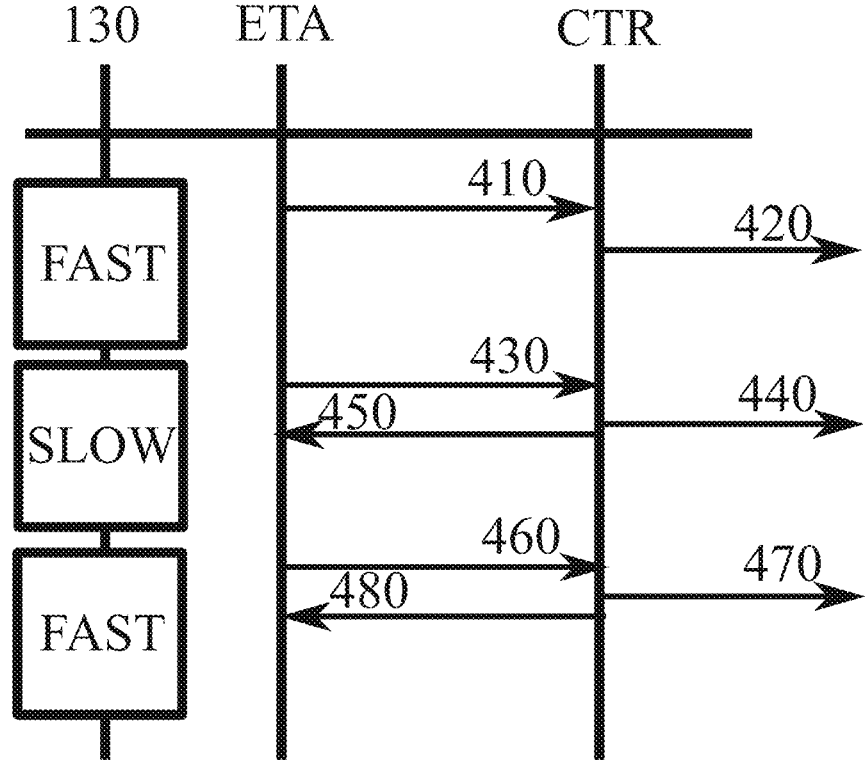
FIG. 4 illustrates signalling in accordance with at least some embodiments of the present invention.

FIG. 4 illustrates signalling in accordance with at least some embodiments of the present invention. On the vertical axes are disposed, on the left, eye 130 of a user (this could also be both eyes), in the centre an eye-tracking apparatus ETA, and on the right, a device CTR configured to process the data and control elements of the eye-tracking apparatus. Time advances from the top toward the bottom. The controller device CTR may be comprised in the eye tracking apparatus ETA, or be physically separate from it.

The eye axis 130 is labelled with three phases, where the eye rotates first fast, then slowly and then fast once more. Here fast and slow denote rotation in excess of a threshold angular velocity and below the threshold angular velocity, respectively.

Initially, phase 410, the eye-tracking apparatus provides eye tracking data to the controller, which reports, phase 420, gaze tracking estimates onward to the application which uses the gaze tracking information. The gaze tracking estimates of phase 420 and, optionally, the eye tracking data of phase 410, includes the gaze direction, such as the gaze direction as a time series of determined gaze directions, for example. Phases 410 and 420 are to be understood as taking place continuously during the first period of fast eye rotation, labelled FAST in the figure.

When the eye 130 enters the slow-movement phase, labelled SLOW in the figure, this will be detectable from determinations of the rotation of the eye present in, or performed based on, the eye tracking data provided from the eye-tracking apparatus to the controller in phase 430. The controller continues providing the gaze tracking estimates to the application, phase 440, and it also instructs the eye-tracking apparatus to enter the power saving state, phase 450. In other words, the controller determines based on the eye tracking data of phase 430 that the time period for applying the power saving state has begun. The ending time of the time period is not yet known. As was the case for phases 410 and 420, also phases 430 and 440 are to be understood as taking place continuously during the period of slow eye movement.

When the eye 130 enters the second fast-movement phase, this will be deducible from determinations of the eye rotation present in, or performed based on, the eye tracking data provided from the eye-tracking apparatus to the controller in phase 460. The controller continues providing the gaze tracking estimates to the application, phase 470, and it also instructs the eye-tracking apparatus to leave the power saving state, phase 480. As was the case for phases 410 and 420, also phases 460 and 470 are to be understood as taking place continuously during the period of fast eye movement. In effect, the controller determines that the time period during which the power saving state is to be applied ends at the start of the second period of fast eye movement, based on the eye-tracking data of phase 460. If a data frame rate of the power saving state is lower than the data frame rate outside of the power saving state, the detection of the beginning of the fast-rotation phase may occur slightly late, in the range of the reciprocal of the low frame rate. In some applications, this can be a problem. Another solution to infer the beginning of the fast-rotation phase is to utilize one or more auxiliary sensors, such as low-power photodetectors or electrooculography sensors, which continuously detect the eye movements with a high framerate, such as 1000 Hz or 1500 Hz. The signal of the fast-rotation and slow-rotation phases would come from this auxiliary sensor device. Yet a further alternative solution would be to turn only, in a binocular system, the other eye's sensor into the power saving mode so that the other eye continue to give data at the original, unreduced, frequency. In other words, hardware, such as illuminator(s) and imaging sensor, of the eye tracking apparatus configured to track one eye is switched to the power saving mode and hardware of the eye tracking apparatus configured to track the other eye is not affected by the power saving mode.

FIG. 5 is a flow graph of a method in accordance with at least some embodiments of the present invention. The phases of the illustrated method may be performed in a controller of an eye tracking apparatus, for example.

Phase 510 comprises controlling elements of an eye tracking apparatus to perform plural determinations of rotation of an eye in an eye socket. Phase 520 comprises determining a time period based at least in part on a determination based on the rotation of the eye, wherein the time period begins as a response to a rotation of the eye falling below a threshold. Finally, phase 530 comprises switching at least a part of the eye tracking apparatus to a power saving state as a response to the determined time period beginning, and switching the at least part of the eye tracking apparatus out of the power saving state as a response to the determined time period ending.

Further, an apparatus may be provided comprising at least one processing core and at least one memory storing instructions that, when executed by the at least one processing core, cause the apparatus at least to control elements of an eye tracking apparatus to perform plural determinations of a pupil size of an eye, to determine a time period based at least in part on a determination based on the pupil size of the eye, wherein the time period begins as a response to rate of change of the pupil size falling below a threshold, and to switch at least a part of the eye tracking apparatus to a power saving state as a response to the determined time period beginning, and switch the at least part of the eye tracking apparatus out of the power saving state as a response to the determined time period ending.

Such pupil size tracking apparatuses find application e.g. in medical ophthalmological devices, such as eye treatment or eye imaging devices, and in diagnosting cognitive state of the user, as the pupil size changes has been shown to reveal, e.g., stress and fatigue. Similar considerations apply as to the technology described herein above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

INDUSTRIAL APPLICABILITY

At least some embodiments of the present invention find industrial application in gaze tracking.

ACRONYMS LIST

AR augmented reality
NIR near-infrared
VR virtual reality

US 12,619,305 B2

13                                                          14

REFERENCE SIGNS LIST

| 101 | user |
| 110 | device which comprises an eye tracking apparatus |
| 120 | screen |
| 122 | point the user looks at |
| 130 | user's eye |
| 142, 144, 146 | illuminators |
| 148 | glints |
| 150 | sensor |
| 300-360 | structure of the device of FIG. 3 |
| 410-480 | phases of the process of FIG. 4 |
| 510-530 | phases of the method of FIG. 5 |

The invention claimed is:

1. An apparatus comprising at least one processing core and at least one memory storing instructions that, when executed by the at least one processing core, cause the apparatus at least to:

control elements of an eye tracking apparatus to perform plural determinations of rotation of an eye in an eye socket;

determine a time period based at least in part on a determination based on the rotation of the eye, wherein the time period begins as a response to a rotation of the eye falling below a threshold, and switch at least a part of the eye tracking apparatus to a power saving state as a response to the determined time period beginning, and switch the at least part of the eye tracking apparatus out of the power saving state as a response to the determined time period ending, wherein the power saving state is a state wherein at least one of the following applies: an image sensor of the eye tracking apparatus operates with a lower frame rate than when the eye tracking apparatus is not in the power saving state, one or more illuminators of the eye tracking apparatus configured to illuminate the eye are switched off or operated with a reduced pulse frequency, compared to when the eye tracking apparatus is not in the power saving state, one or more clock frequency of the eye tracking apparatus is reduced compared to respective one or more clock frequency when the eye tracking apparatus is not in the power saving state or an imaging sensor of the eye tracking apparatus is switched off.

2. The apparatus according to claim 1, configured to assign to the time period a predetermined duration, or a duration selected by the apparatus.

3. The apparatus according to claim 1, configured to select the duration of the time period based on an estimated amplitude of the rotation of the eye between gaze direction fixations, such that the apparatus is configured to select a longer duration as a response to a smaller-amplitude rotation of the eye and a shorter duration as a response to a larger-amplitude rotation of the eye.

4. The apparatus according to claim 1, configured to determine the end of the time period such that the time period ends when the rotation of the eye increases above the threshold.

5. The apparatus according to claim 1, configured to further determine at least one of the beginning and the end of the time period, and/or select a specific power saving state from plural possible power saving states, based on an application the eye tracking apparatus sends the determined gaze direction to.

6. The apparatus according to claim 5, configured to determine the at least one of the beginning and the end of the time period, and/or select the specific power saving state from plural possible power saving states, based on an active stage of the application the eye tracking apparatus sends the determined gaze direction to.

7. The apparatus according to claim 5, configured to receive from the application an indication, and to operate the eye tracking apparatus at an imaging frequency selected by the apparatus based on the indication received from the application.

8. An apparatus comprising at least one processing core and at least one memory storing instructions that, when executed by the at least one processing core, cause the apparatus at least to:

control elements of an eye tracking apparatus to perform plural determinations of rotation of an eye in an eye socket;

determine a time period based at least in part on a determination based on the rotation of the eye, wherein the time period begins as a response to a rotation of the eye falling below a threshold, and switch at least a part of the eye tracking apparatus to a power saving state as a response to the determined time period beginning, and switch the at least part of the eye tracking apparatus out of the power saving state as a response to the determined time period ending, the apparatus being further configured to use a second sensor to perform the determination of the rotation of the eye and to use an output of the second sensor in determining the beginning and the ending of the time period, wherein the eye tracking apparatus further comprises a first sensor which is affected by the power saving state, the second sensor not affected by the power saving state.

9. An apparatus comprising at least one processing core and at least one memory storing instructions that, when executed by the at least one processing core, cause the apparatus at least to:

control elements of an eye tracking apparatus to perform plural determinations of rotation of an eye in an eye socket;

determine a time period based at least in part on a determination based on the rotation of the eye, wherein the time period begins as a response to a rotation of the eye falling below a threshold, and switch at least a part of the eye tracking apparatus to a power saving state as a response to the determined time period beginning, and switch the at least part of the eye tracking apparatus out of the power saving state as a response to the determined time period ending, wherein the eye tracking apparatus is configured to track two eyes, and the power saving state is a state wherein the eye tracking apparatus tracks one of the two eyes using a lowered imaging frequency and another one of the two eyes with a non-lowered imaging frequency, compared to when the eye tracking apparatus is not in the power saving state.

10. An apparatus comprising at least one processing core and at least one memory storing instructions that, when executed by the at least one processing core, cause the apparatus at least to:

control elements of an eye tracking apparatus to perform plural determinations of a pupil size of an eye;

determine a time period based at least in part on a determination based on the pupil size of the eye, wherein the time period begins as a response to rate of change of the pupil size falling below a threshold, and switch at least a part of the eye tracking apparatus to a power saving state as a response to the determined time period beginning, and switch the at least part of the eye tracking apparatus out of the power saving state as a response to the determined time period ending.

11. A method, comprising:

controlling elements of an eye tracking apparatus to perform plural determinations of rotation of an eye in an eye socket;

determining a time period based at least in part on a determination based on the rotation of the eye, wherein the time period begins as a response to a rotation of the eye falling below a threshold, and switching at least a part of the eye tracking apparatus to a power saving state as a response to the determined time period beginning, and switching the at least part of the eye tracking apparatus out of the power saving state as a response to the determined time period ending, wherein the power saving state is a state wherein at least one of the following applies: an image sensor of the eye tracking apparatus operates with a lower frame rate than when the eye tracking apparatus is not in the power saving state, one or more illuminators of the eye tracking apparatus configured to illuminate the eye are switched off or operated with a reduced pulse frequency, compared to when the eye tracking apparatus is not in the power saving state, one or more clock frequency of the eye tracking apparatus is reduced compared to respective one or more clock frequency when the eye tracking apparatus is not in the power saving state or an imaging sensor of the eye tracking apparatus is switched off.

12. A non-transitory computer readable medium having stored thereon a set of computer readable instructions that, when executed by at least one processor, cause an apparatus to at least:

control elements of an eye tracking apparatus to perform plural determinations of rotation of an eye in an eye socket;

determine a time period based at least in part on a determination based on the rotation of the eye, wherein the time period begins as a response to a rotation of the eye falling below a threshold, and switch at least a part of the eye tracking apparatus to a power saving state as a response to the determined time period beginning, and switch the at least part of the eye tracking apparatus out of the power saving state as a response to the determined time period ending, wherein the power saving state is a state wherein at least one of the following applies: an image sensor of the eye tracking apparatus operates with a lower frame rate than when the eye tracking apparatus is not in the power saving state, one or more illuminators of the eye tracking apparatus configured to illuminate the eye are switched off or operated with a reduced pulse frequency, compared to when the eye tracking apparatus is not in the power saving state, one or more clock frequency of the eye tracking apparatus is reduced compared to respective one or more clock frequency when the eye tracking apparatus is not in the power saving state or an imaging sensor of the eye tracking apparatus is switched off.

13. The apparatus according to claim 9, wherein hardware of the eye tracking apparatus configured to track one and only one eye is switched to the power saving mode as a response to the time period beginning.

* * * * *